United States Patent
Hahn et al.

(10) Patent No.: US 7,480,672 B2
(45) Date of Patent: Jan. 20, 2009

(54) MULTIPLE LOG QUEUES IN A DATABASE MANAGEMENT SYSTEM

(75) Inventors: Uwe Hahn, Berlin (DE); Martin E. Brunzema, Berlin (DE)

(73) Assignee: SAP AG, Walldorf (DE)

( * ) Notice: Subject to any disclaimer, the term of this patent is extended or adjusted under 35 U.S.C. 154(b) by 416 days.

(21) Appl. No.: 11/095,128

(22) Filed: Mar. 31, 2005

(65) Prior Publication Data

US 2006/0224634 A1 Oct. 5, 2006

(51) Int. Cl.
*G06F 17/30* (2006.01)

(52) U.S. Cl. .......................... 707/102; 707/9

(58) Field of Classification Search ............ 707/8, 707/9, 10, 100, 102, 200, 201, 202, 203, 707/204, 205; 713/134, 165; 719/314, 321, 719/328; 711/114, 128, 141, 158, 163, 170; 718/100, 102, 104, 105; 710/260
See application file for complete search history.

(56) References Cited

U.S. PATENT DOCUMENTS

| | | | |
|---|---|---|---|
| 5,515,538 A * | 5/1996 | Kleiman | 710/260 |
| 6,678,704 B1 * | 1/2004 | Bridge, Jr. et al. | 707/202 |
| 6,721,765 B2 * | 4/2004 | Ghosh et al. | 707/202 |
| 2001/0026551 A1 * | 10/2001 | Horlin | 370/389 |
| 2002/0178177 A1 * | 11/2002 | Park et al. | 707/202 |
| 2003/0056073 A1 * | 3/2003 | Zeiger | 711/170 |
| 2004/0010499 A1 * | 1/2004 | Ghosh et al. | 707/100 |
| 2006/0117325 A1 * | 6/2006 | Wieland et al. | 719/321 |

* cited by examiner

*Primary Examiner*—Diane Mizrahi
(74) *Attorney, Agent, or Firm*—Buckley, Maschoff & Talwalkar LLC

(57) ABSTRACT

A system, method, apparatus, means and computer program code for utilizing multiple log queues in a database management system are provided. In some embodiments, processing includes receiving a first log record at a first log queue and a second log record at a second log queue, associating a log queue identifier with each of the first and second log records, and writing the first and second log records to a data log. Pursuant to some embodiments, at least a third log queue is provided.

15 Claims, 6 Drawing Sheets

MULTIPLE LOG QUEUES IN A DATABASE MANAGEMENT SYSTEM

FIELD

Embodiments of the present invention relate to database systems. More specifically, some embodiments relate to systems and methods for implementing multiple log queues in a database management system.

BACKGROUND

Database systems are widely used for a number of applications. Generally, the applications demand data integrity and consistency. That is, the database systems are relied upon by applications to accurately and efficiently store and retrieve data.

Many database systems use a transaction log or log file to store log records associated with operations or changes associated with a database. Every transaction (where "transaction" refers to a set of operations) associated with the database must cause a log record to be written into the log that describes the transaction and its affect on the data in the database. For example, each log record may contain information identifying the database change that occurred as a result of the transaction. In this manner, a record of information is preserved that can be used to recover from errors or to restore the database to a prior state. In general, transactions are written to the transaction log sequentially using a log queue. The log queue is used as a cache to write log records into log pages. A log writer task or subroutine operates to write pages from the log queue to a storage medium or log disc.

One technique that has improved the overall performance of database systems is the use of multiprocessing techniques, where computer systems having multiple processors are used to process database transactions in parallel. Unfortunately, these parallel processing techniques lead to transaction collisions and delays in writing transaction data to the log queue. For example, transactions being processed in parallel may need to wait to be written to the log while another transaction has its commit log record successfully written.

It would be desirable to provide improved systems and methods for implementing multiple log queues in a database management system.

SUMMARY

Pursuant to some embodiments, a system, method, apparatus, means and computer program code are provided and include receiving a first log record at a first log queue and a second log record at a second log queue, associating a log queue identifier with each of the first and second log records, and writing the first and second log records to a data log (also referred to as a "redo log" or "log volume"). Pursuant to some embodiments, at least a third log queue is provided.

Pursuant to some embodiments, separate writers are associated with each log queue. In some embodiments, a log writer supports one or more log queues. Pursuant to some embodiments, log records are written such that they are associated with information identifying a writer sequence identifier and information identifying the log queue through which it was written. In some embodiments, log pages are read from a data log by sorting the log pages from the different log queues before reading the records.

With these and other advantages and features that will become hereafter apparent, a more complete understanding of the nature of the invention can be obtained by referring to the following detailed description and to the drawings appended hereto.

DETAILED DESCRIPTION

To alleviate problems inherent in the art, embodiments of the present invention introduce systems, methods, computer program code stored on a medium and executed by a processor, and means for implementing multiple log queues in a database management system. For convenience, clarity and ease of exposition, a number of terms are used herein. For example, the term "server" is used to refer to software configured to perform tasks in response to requests from a "client". One or more servers may be implemented on a given computing device. As used herein, the terms "log record" or "log entry" are used to refer to data records created by a database system for storage in a log file or log page for use in error recovery or other operations Features of embodiments of the present invention may be used in any of a number of different types of systems, including, for example, database systems. For example, applicants have discovered that features of embodiments provide desirable results when used in conjunction with a database system such as a structured query language (SQL) database system, although those skilled in the art will appreciate that features of embodiments may be implemented in other types of systems with desirable results. Further, applicants have discovered that features of embodiments provide desirable results when used in conjunction with a database server that is implemented in a multi-processor architecture.

Figure 1:
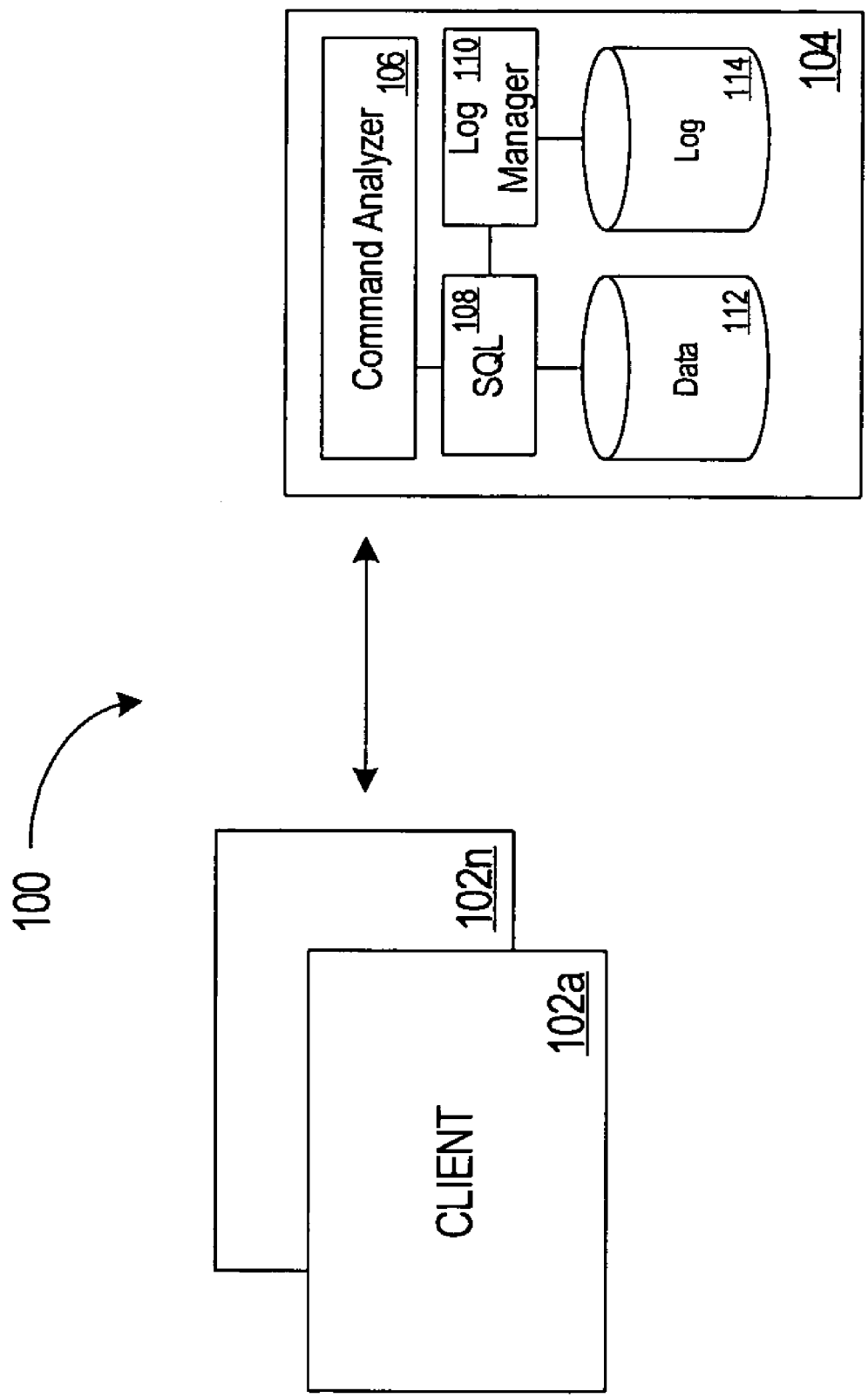
FIG. 1 is a diagram of a system according to some embodiments.

To illustrate features of some embodiments of the present invention, reference is first made to FIG. 1 where an illustrative database system 100 is shown. For simplicity, only several components of database system 100 are shown in FIG. 1; those skilled in the art will appreciate that a database system typically may include a number of other components including, for example, I/O devices, drivers, APIs, and the like. Database system 100 may be, for example, a SQL database system. For the purpose of illustration, but not limitation, database server 104 may be the MaxDB® system offered by mySQL AB and SAP AG of Walldorf Germany.

Database system 100 includes one or more client devices 102 interacting with a database server 104. For example, each client device 102 includes software configured to allow one or more users or applications to interact with database server 104 to submit queries and receive database responses. As a simple example, client 102 may be a computing device (such as a personal computer) operating Internet browser software (such as Microsoft's Internet Explorer®) to interact with database server 104 over a network connection by submitting SQL queries to database server 104 and by receiving responses from the database server 104.

While the system 100 of FIG. 1 only shows two client devices 102 and a single database server 104, those skilled in the art will recognize that database system 100 may include any number of clients interacting with one or more database servers. Further, for the purpose of illustration but not limitation, some or all of the client devices 102 and database server 104 may be implemented on computing devices such as, for example, computing devices implemented with Intel® x86 processors running a version of Microsoft Windows® or LINUX.

Database server 104 may consist of a number of elements (some of which are shown) interacting to create databases, store data, and respond to queries, including, for example, a command analyzer 106, a SQL component 108, a data store 112, a log manager 110 and a data log 114. In general, database server 104 receives a database request from client 102 and responds to the request. Command analyzer 106 operates to analyze requests to identify the specific database interactions to be taken and passes SQL commands to SQL system 108 for application to one or more databases 112.

Database systems generally include some ability to be restored to a consistent state after an error has occurred. One mechanism for performing such a restore is the use of a log manager 110 controlling a data log 114 (otherwise referred to as the log area of the database system). In general, data log 114 includes all log volumes of a database instance, and contains the information needed to restore the database instance to a consistent state after an error has occurred. In some systems, the log area is overwritten in a cyclical fashion and is backed up on a regular basis. The management of the storage, retrieval, and use of the log data is controlled by log manager 110. Log manager 110 may include one or more specialized managers such as, for example, log managers controlling offline logging (e.g., to control the reading of operations of transactions for a restart) and log managers controlling online logging (e.g., to control the writing of log information into an archive log, and to control the reading and writing of undo transactions).

Pursuant to some embodiments, multiple log queues are provided, allowing data from multiple transaction threads to be written to data log 114 in an improved fashion over prior systems. For example, pursuant to some embodiments, the use of multiple log queues allows log records from different transaction threads to be assigned to different log queues and written to the queues substantially at the same time. This can provide desirable results in, for example, multi-processor systems in which separate transaction threads are associated with separate processors. In some embodiments, the number of transaction threads depends on a database system's hardware configuration, the number of CPU's used, and the way the database parameters are set.

Those skilled in the art will appreciate that a database instance may use several operating system threads. The primary type of thread is generally referred to as a "user kernel thread" (UKT). UKTs are used to process client requests. These threads are the primary users of processing time in a database system. A database instance generally has several UKTs (particularly in multi-processor database systems). In a SQL database system, SQL statements are processed in UKTs in the form of tasks, with several tasks sharing a UKT. Upon completion of an operation of a transaction, each UKT writes a log record to a log queue. Pursuant to embodiments disclosed herein, a separate log queue is provided for each UKT (or other thread). In some embodiments, several threads may share a separate log queue, so long as the ratio of threads to log queues is selected to reduce collisions or bottlenecks as log records are written from the threads to the log queues.

Figure 2:
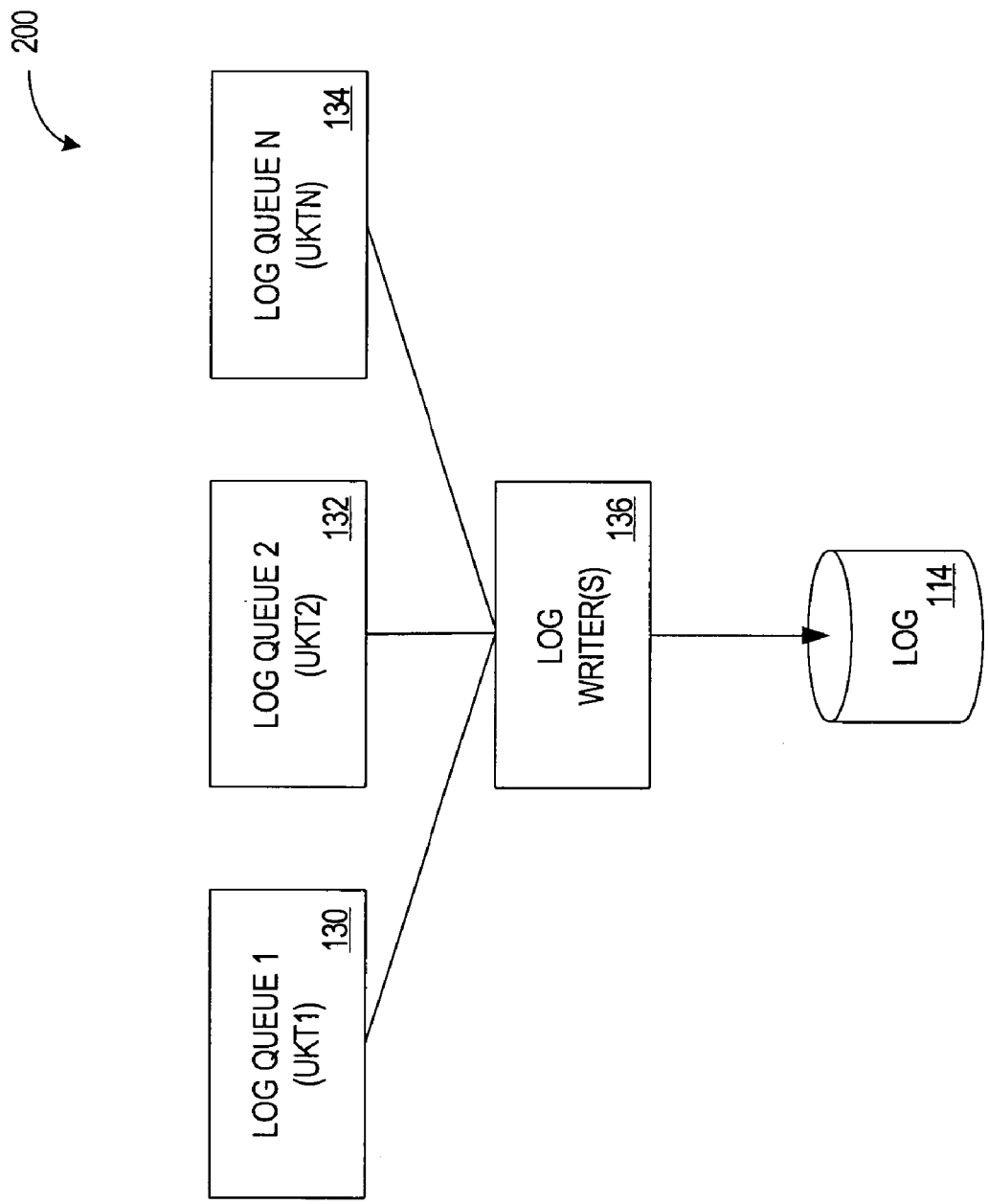
FIG. 2 is a diagram of a portion of a system according to some embodiments.

The multiple log queues of some embodiments are shown in FIG. 2. In particular, FIG. 2 depicts a portion 200 of a database system including a number of log queues 130, 132, and 134. Each log queue 130, 132,134 is associated with a respective operating system thread (referred to as UKT1-UKTn) and is designated as receiving log records from each of the respective threads. Each log queue 130,132, and 134 may queue a number of log records for writing to data log 114. Although three log queues are shown in FIG. 2, those skilled in the art, upon reading this disclosure, will appreciate that other numbers of log queues may be used.

Each of the log records in the log queues 130,132, and 134 are written to data log 114 using one or more log writer(s) 136. For example, in some embodiments, a single log writer may support two or more log queues. In such embodiments, each log record may be tagged or associated with an identifier identifying which log queue it was associated with. Each log record may also be tagged or associated with a log sequence identifier (e.g., such as a counter used to assign a unique identifier to each log record written to the shared writer). In some embodiments, each log queue may be associated with a single log writer. Again, each log record may be tagged (or associated) with a unique log sequence identifier. In such embodiments, each log record may also be tagged (or associated) with information identifying the log queue and/or the log writer that performed the log writing.

In general, log writer(s) 136 are tasks in (or associated with) the UKTs that are initialized when the database system 100 is started (e.g., using stored internal configuration data) to write the log records or log entries from each log queue to the log area. In some embodiments, log writer(s) 136 are configured to write data to the log area at certain times. For example, log writer(s) 136 may be configured to write data to the log area upon a transaction "commit". The "commit" of a transaction is successful if all of its log entries and the commit log entry was written to the disk.

Figure 3:
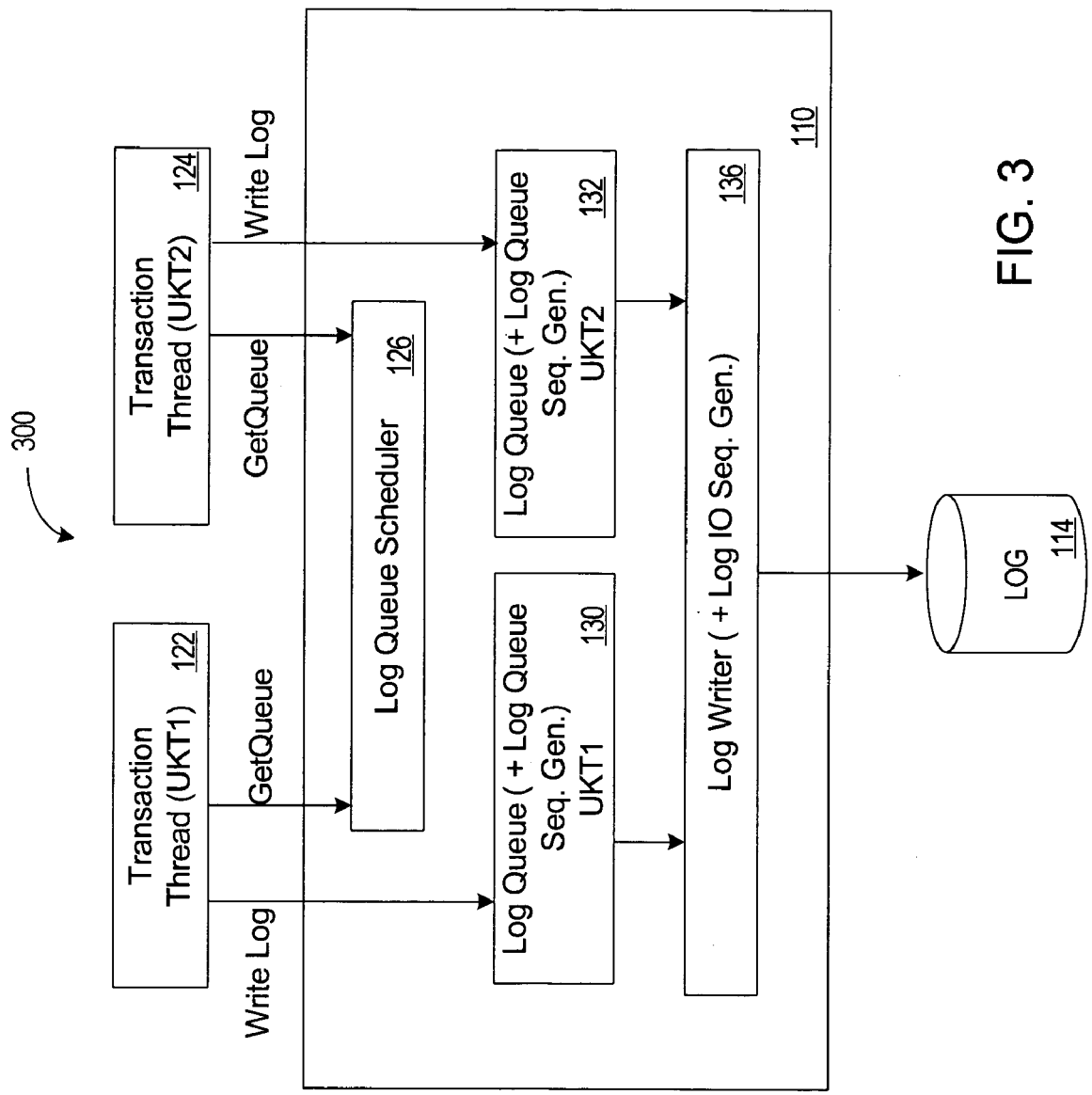
FIG. 3 is a diagram illustrating components of a log writer according to some embodiments.

Reference is now made to FIG. 3 where a block diagram 300 is shown depicting selected components of database server 104 including two transaction threads 122,124, log manager 110, and data log 114. As shown, each transaction thread 122,124 writes log data to a particular log queue 130, 132 of log manager 110 after obtaining a queue identifier from log queue scheduler 126. Log queue scheduler 126 may be configured, if desired, to enforce mechanisms that ensure that only one transaction of a set of transactions can run. For example, log queue scheduler 126 may ensure that such a set of transactions be assigned to one log queue (such as log queue 130 or 132). In this manner, only one transaction can collide with the log writer on the log queue.

In some database systems, such as, for example, the MaxDB database system, transactions are executed by coroutines running in a single transaction thread. That is, only one transaction is running in the thread. In such a system, embodiments may utilize features of log queue scheduler 126 to assign transactions of one thread to a specific log queue (e.g., log queue scheduler 126 may ensure that transactions from UKT1 124 are assigned to log queue UKT1 130). At substantially the same time, transactions of another thread (e.g., such as UKT2 124) can write their own log queue independently from the transactions of other threads, thereby improving system performance and reducing collisions and bottlenecks. Those skilled in the art, upon reading this disclosure, will appreciate that such scheduling could also be enforced using other techniques.

Log queue scheduler 126 passes log records or log entries from each transaction thread 122, 124 to the appropriate log queue 130, 132, which then passes the log records or log entries to the log writer 136 for writing to data log 114.

Each log queue 130, 132, in the embodiment shown in FIG. 3, includes a log queue sequence generator that assigns a unique sequence number to each log record of each log queue. These log sequence generators may be a simple counter or other sequence generator known to those skilled in the art. The log sequence generators, and the log sequence number associated with each log record, are used to ensure that data can be accurately recovered during, for example, a restart. Further, pursuant to some embodiments, because log records can be larger than one log page in size, each log page is saved with the log queue number that created the log page so that a log reader (not shown) can accurately determine how to sort the pages. A log I/O sequence generator associated with log writer 136 may also be provided to identify each log page written by the writer.

In this manner, embodiments ensure that information is properly written to the data volumes and that a restart may be performed accurately. During a restart, the log records from the point of the last savepoint must be read from the data log 114 and redone so that at the end of the restart all committed changes are persistent in the database. Pursuant to some embodiments, during a restart, the log reader sorts the log pages from the different log queues before reading the log records. An example of a log page pursuant to some embodiments will be described further below in conjunction with FIG. 5.

Figure 4:
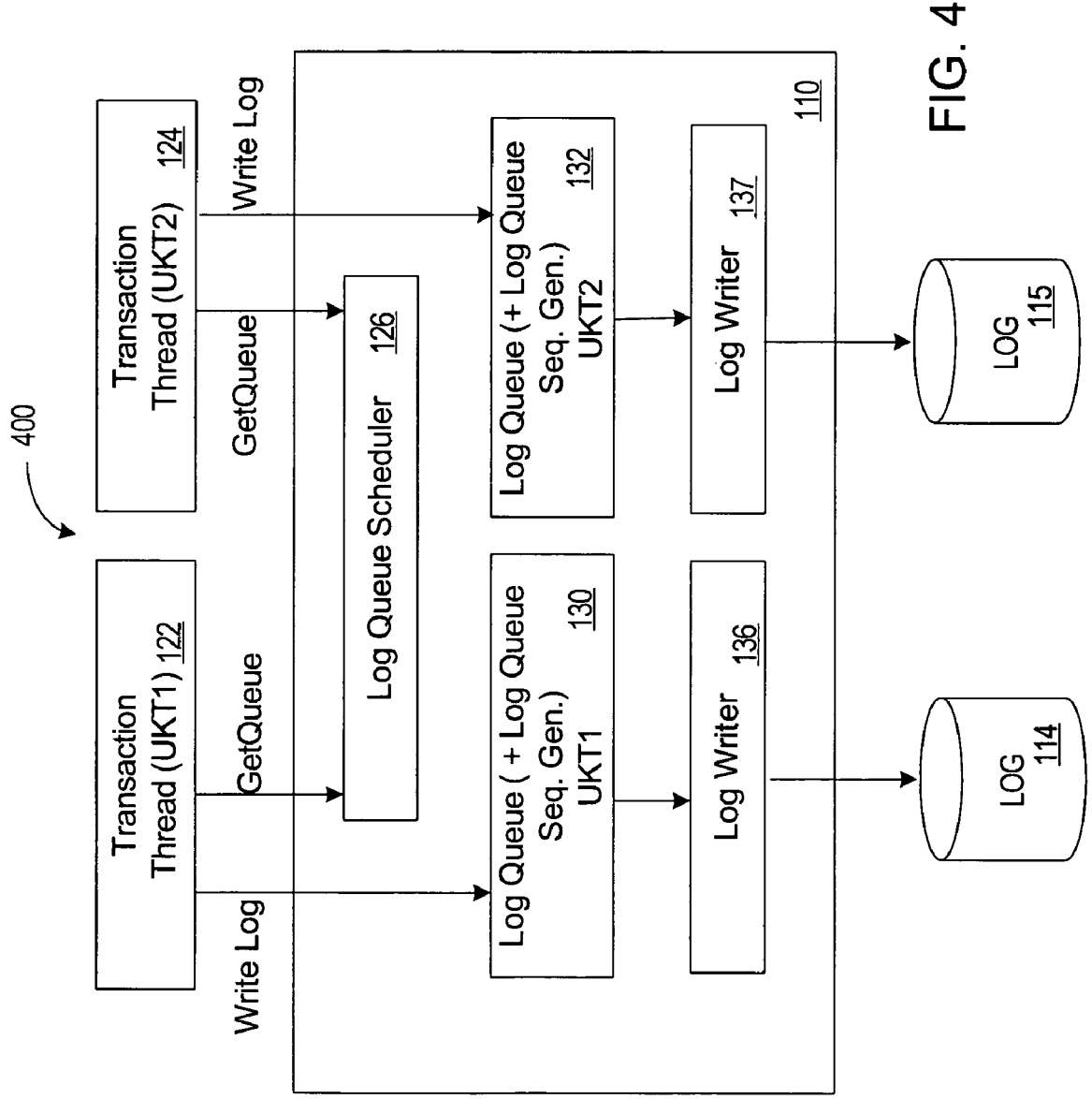
FIG. 4 is a second diagram illustrating components of a log writer according to some embodiments.

Reference is now made to FIG. 4 where a block diagram 400 is shown depicting selected components of database server 104 including two transaction threads 122, 124, log manager 110, and data logs 114, 115. As shown, each transaction thread 122, 124 passes data to log queues 130, 132 upon receipt of a response to a GetQueue command from log queue scheduler 126. Log queue scheduler 126 may be configured, if desired, to enforce mechanisms that ensure that only one transaction of a set of transactions can run. As discussed above, for example, log queue scheduler 126 may ensure that such a set of transactions be assigned to one log queue (such as log queue 130 or 132).

Log queue scheduler 126 passes log records or log entries from each transaction thread 122, 124 to the appropriate log queue 130, 132, which then passes the log records or log entries to their respective log writers 136, 137 for writing to data logs 114, 115. In some embodiments, each log queue has an associated log writer. In some embodiments, several log queues may share access to a log writer.

Pursuant to some embodiments, each log queue 130, 132 assigns unique identifying information to log records or log entries that pass through the queue (including, for example, a log sequence number and a log queue identifier). In some embodiments, these identifiers are appended or associated with each log record or log entry that is written to data logs 114, 115. In some embodiments, these identifiers are generated by log writer 136, 137 prior to writing.

As discussed above, these identifiers are used to ensure that data can be accurately recovered during, for example, a restart. Further, pursuant to some embodiments, because log records can be larger than one log page in size, each log page is saved with the log queue number that created the log page so that a log reader (not shown) can accurately determine how to sort the pages.

In this manner, embodiments ensure that a restart may be performed accurately. During a restart, the log records from the point of the last save point must be read from the data logs 114, 115 and redone so that at the end of the restart all committed changes are persistent in the database. Pursuant to some embodiments, during a restart, the log reader sorts the log pages from the different log queues before reading the log records. An example of a log page pursuant to some embodiments will be described further below in conjunction with FIG. 6.

Figure 5:
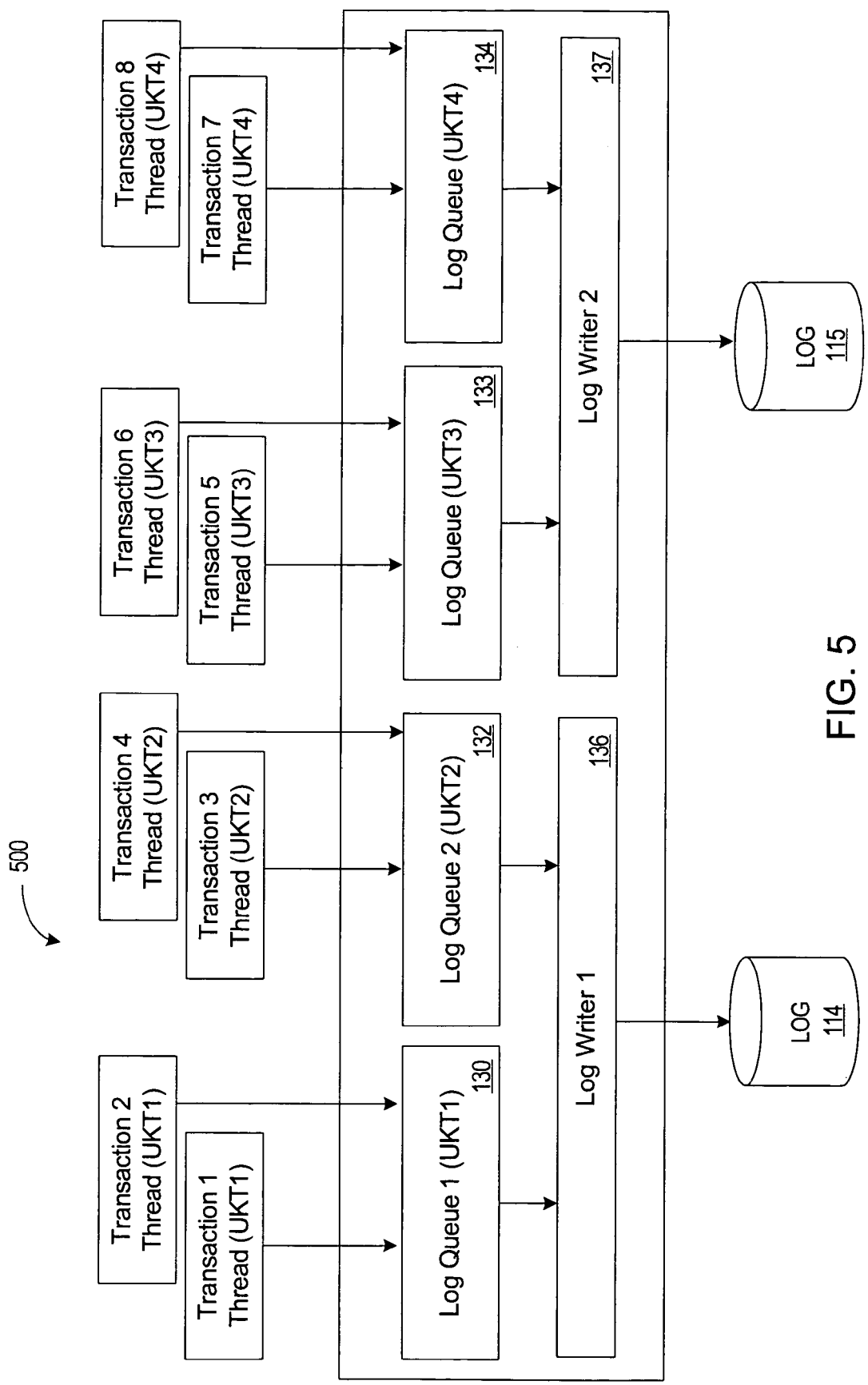
FIG. 5 is a third diagram illustrating components of a log writer according to some embodiments.

Reference is now made to FIG. 5 where a further embodiment is depicted including a number of transactions threads in communication with a number of log queues 130-134, and where each log writer 136, 137 supports several log queues. Each log writer 136, 137 is configured to write data to separate data logs 114, 115. As discussed above, transaction sequence numbers, log queue sequence numbers and log I/O sequence numbers may be used to track and identify the data in each data log 114, 115.

Figure 6:
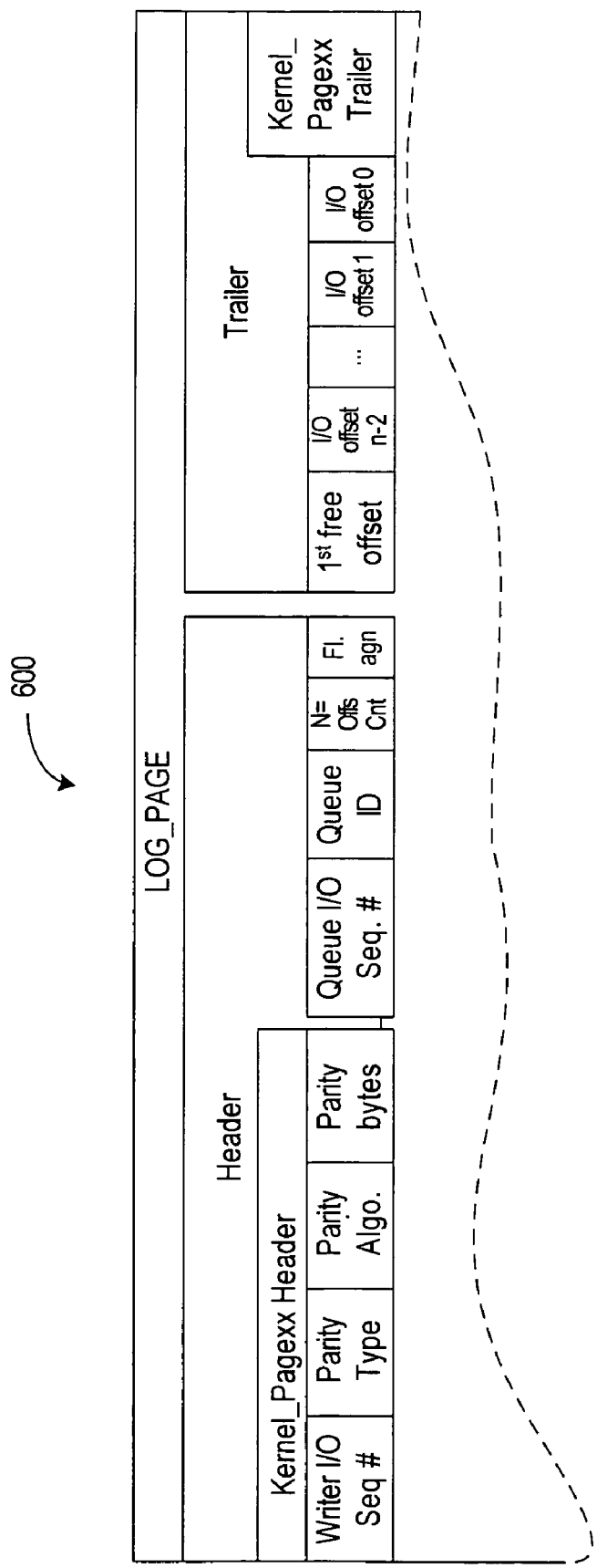
FIG. 6 is a diagram illustrating data elements included in a log page written pursuant to some embodiments.

Reference is now made to FIG. 6 where an example log page 600 from, for example, data log 114 is shown. Those skilled in the art will appreciate that many configurations of log pages may be used, so long as the data is readily retrievable during a restart or other operation. As such, log page 600 is illustrative but not limiting. As depicted, log page 600 includes a header and a trailer. The header includes a first portion containing a writer I/O sequence number including the sequence identifier of the page. This sequence number is, for example, the sequence number identified by log sequence generators of the embodiments described in FIGS. 3, 4, or 5.). The header also includes data to identify the page type, as well as a parity algorithm and parity data as known to those skilled in the art.

Log page 600 also includes data identifying the queue from which the page was written, including a queue I/O sequence number (defining the I/O sequence number of the specific queue by which the page was built and written) and an identifier of the log queue. The header also includes offset data to identify the number of page offsets included in the page trailer and a flag indicating whether the page must be (or has been) flushed again on the same log device position.

The trailer of log page 600 includes offset information (e.g., including information identifying the byte offset on the page denoting the position where the next log entry will be written, etc.). Those skilled in the art will recognize that other or additional data may also be included to allow the efficient and accurate recovery of data from data log 114.

Although the present invention has been described above with respect to some embodiments thereof, it should be noted that the above-described embodiments may be altered to create completely or partially different embodiments without departing from the spirit and scope of the appended claims.

What is claimed is:

1. A method for utilizing multiple log queues in a database management system, the method comprising:

writing a first log record to a first log queue associated with a first transaction thread;

writing a second log record to a second log queue associated with a second transaction thread simultaneously at the same time as said writing of said first log record to said first log queue, said first log queue and said second log queue not comprising a shared cache;

associating a log queue identifier with each of said first and second log records, the log queue identifier identifying said log queue to which each of said first and second log records is written;

writing said first log record in said first log queue, including said log queue identifier associated with said first log record, to a data log disc; and writing said second log record in said second log queue, including said log queue identifier associated with said second log record, to said data log disc, to facilitate efficient writing of said first and second log records to said data log disc.

2. The method of claim 1, wherein said writing of said first and second log records is performed using a log writer.

3. The method of claim 2, further comprising:
associating a first and a second log queue sequence identifier with said first and second log records, respectively.

4. The method of claim 3, wherein said first and second log queue sequence identifiers are generated by a sequence generator shared by said first and second log queues.

5. The method of claim 3, wherein said first log queue sequence identifier is generated by a sequence generator associated with said first log queue, and said second log queue sequence identifier is generated by a sequence generator associated with said second log queue.

6. The method of claim 1, wherein said writing said first log record is performed using a first log writer and said writing said second log record is performed using a second log writer.

7. The method of claim 1, further comprising:
writing a third log record to a third log queue at substantially the same time as at least one of the first and second log records is written to the respective first and second log queues;
associating a log queue identifier with said third log record; and
writing said third log record including its associated log queue identifier to said data log.

8. A database system, comprising:
a processor;
a first log queue associated with a first transaction thread and to receive a first log record from said first transaction thread;
a second log queue associated with a second transaction thread and to receive a second log record from said second transaction thread at substantially the same time as said first log queue receives said first log record, said first and second log queues not comprising a shared cache;
a log queue scheduler to provide a queue identifier to associate with each log record in said first and second log queues;
a data log storage disc;
a first log writer associated with said first log queue and to write said first log record, including its associated log queue identifier, from said first log queue to the data log storage disc; and
a second log writer associated with said second log queue and to write said second log record, including its associated log queue identifier, from said second log queue to said data log storage disc.

9. The database system of claim 8,
wherein a first and a second log queue sequence identifier are associated with said first and second log records, respectively.

10. A log disc system, the log disc system comprising:
a processor to execute:
instructions to receive a first log record at a first log queue and a second log record at a second log queue at substantially the same time, said first log queue and said second log queue not comprising a shared cache;
instructions to associate a log queue identifier with each of said first and second log records; and
instructions to write said first and second log records in said first and said second log queues, including the associated log queue identifier for each of said first and second log records, to a data log disc.

11. The log disc system of claim 10, wherein said writing of said first and second log records is performed using a log writer.

12. The log disc system of claim 11, further comprising:
instructions to associate a first and a second log queue sequence identifier with said first and second log records, respectively.

13. The log disc system of claim 12, wherein said first and second log queue sequence identifiers are generated by a sequence generator shared by said first and second log queues.

14. The log disc system of claim 12, wherein said first log queue sequence identifier is generated by a sequence generator associated with said first log queue, and said second log queue sequence identifier is generated by a sequence generator associated with said second log queue.

15. The log disc system of claim 10, wherein said writing said first log record is performed using a first log writer and said writing said second log record is performed using a second log writer.

* * * * *